(12) United States Patent
Chaussade et al.

(10) Patent No.: US 9,378,175 B2
(45) Date of Patent: Jun. 28, 2016

(54) DATA TRANSFER BETWEEN A MASTER AND SLAVE

(75) Inventors: Nicolas Chaussade, Mouans-Sartoux (FR); Pierre Michel Broyer, Vence (FR); Phillipe Luc, Nice (FR)

(73) Assignee: ARM Limited, Cambridge (GB)

( * ) Notice: Subject to any disclaimer, the term of this patent is extended or adjusted under 35 U.S.C. 154(b) by 2064 days.

(21) Appl. No.: 11/979,361

(22) Filed: Nov. 1, 2007

(65) Prior Publication Data

US 2008/0147921 A1    Jun. 19, 2008

(30) Foreign Application Priority Data

Dec. 13, 2006 (GB) .................................. 0624875.1

(51) Int. Cl.
*G06F 3/00* (2006.01)
*G06F 5/00* (2006.01)
*G06F 13/00* (2006.01)
*G06F 13/42* (2006.01)

(52) U.S. Cl.
CPC .................................. *G06F 13/4291* (2013.01)

(58) Field of Classification Search
None
See application file for complete search history.

(56) References Cited

U.S. PATENT DOCUMENTS

| | | | | |
|---|---|---|---|---|
| 5,668,982 A * | 9/1997 | Davis | ............................ | 713/600 |
| 5,909,563 A * | 6/1999 | Jacobs | ........................... | 710/305 |
| 5,909,701 A | 6/1999 | Jeddeloh | | |
| 6,128,748 A * | 10/2000 | MacWilliams et al. | ........ | 713/401 |
| 6,256,692 B1 * | 7/2001 | Yoda et al. | ..................... | 710/104 |
| 6,345,330 B2 * | 2/2002 | Chu | ............................... | 710/65 |
| 6,584,536 B1 * | 6/2003 | Deng | ............................. | 710/310 |
| 6,591,294 B2 * | 7/2003 | Kawasaki et al. | ............. | 709/209 |
| 6,898,726 B1 | 5/2005 | Lee | | |
| 7,023,836 B2 * | 4/2006 | Badalucco et al. | ........... | 370/351 |
| 7,089,338 B1 * | 8/2006 | Wooten et al. | ................ | 710/110 |
| 7,219,177 B2 * | 5/2007 | Chang et al. | .................. | 710/110 |
| 7,433,972 B2 * | 10/2008 | Kou | ................................ | 710/14 |

(Continued)

FOREIGN PATENT DOCUMENTS

| | | |
|---|---|---|
| EP | 1 058 121 | 12/2000 |
| GB | 2 398 655 | 8/2004 |
| JP | 7-306827 | 11/1995 |

OTHER PUBLICATIONS

First Office Action dated Jun. 24, 2010 for Chinese Application No. 2007103002140 and English translation.

*Primary Examiner* — Henry Tsai
*Assistant Examiner* — Christopher Bartels
(74) *Attorney, Agent, or Firm* — Nixon & Vanderhye P.C.

(57) ABSTRACT

A data processing apparatus comprising at least one initiator operable to communicate with at least one recipient via a bus; said at least one initiator comprising an output port for sending data to said bus and an input port for receiving data from said bus; said data processing apparatus further comprising an initiator clock signal generator, an initiator output enable signal generator and an initiator input enable signal generator, said initiator being clocked by said initiator clock signal; said output port being clocked by said initiator output enable signal such that said output port is operable to assert data to a write channel on said bus in response to said initiator output enable signal having a first predetermined level and said input port is operable to latch data received on a read channel on said bus in response to said initiator input enable signal having a second predetermined level; wherein said initiator output enable signal generator and initiator input enable signal generator are configured to output signals that are different to each other.

11 Claims, 4 Drawing Sheets

(56) References Cited

U.S. PATENT DOCUMENTS

| | | | |
|---|---|---|---|
| 7,600,143 B1* | 10/2009 | Neuman | 713/500 |
| 2001/0007136 A1* | 7/2001 | Tamura et al. | 713/500 |
| 2001/0007999 A1* | 7/2001 | Rasmussen et al. | 710/60 |
| 2001/0027503 A1* | 10/2001 | Yamato et al. | 710/126 |
| 2002/0083359 A1* | 6/2002 | Dow | 713/500 |
| 2002/0138709 A1* | 9/2002 | Ball et al. | 711/211 |
| 2002/0145919 A1* | 10/2002 | Lamb et al. | 365/189.09 |
| 2002/0162084 A1* | 10/2002 | Butts et al. | 716/17 |
| 2003/0014681 A1* | 1/2003 | McBride et al. | 713/401 |
| 2003/0097467 A1* | 5/2003 | Sano | 709/238 |
| 2003/0099138 A1* | 5/2003 | Kyung | 365/200 |
| 2003/0101299 A1* | 5/2003 | Kondo et al. | 710/110 |
| 2004/0064615 A1* | 4/2004 | Hammitt et al. | 710/107 |
| 2004/0105339 A1 | 6/2004 | Iwahashi et al. | |
| 2004/0141391 A1* | 7/2004 | Lee et al. | 365/200 |
| 2004/0159546 A1* | 8/2004 | Zhang et al. | 204/403.01 |
| 2004/0193936 A1* | 9/2004 | Kelly | 713/500 |
| 2004/0221084 A1* | 11/2004 | Yates et al. | 710/305 |
| 2004/0230866 A1* | 11/2004 | Yates et al. | 714/25 |
| 2004/0234014 A1* | 11/2004 | Chen | 375/350 |
| 2005/0065745 A1* | 3/2005 | Jiang | 702/106 |
| 2005/0204077 A1* | 9/2005 | Kou | 710/36 |
| 2005/0262376 A1* | 11/2005 | McBain | 713/600 |
| 2005/0268130 A1* | 12/2005 | Naruse et al. | 713/322 |
| 2006/0038583 A1* | 2/2006 | Lim | 326/30 |
| 2006/0056257 A1* | 3/2006 | Origasa | 365/222 |
| 2006/0067156 A1 | 3/2006 | Ruckerbauer et al. | |
| 2006/0106951 A1* | 5/2006 | Bains | 710/5 |
| 2007/0070669 A1* | 3/2007 | Tsern | 365/51 |
| 2007/0156995 A1* | 7/2007 | Kaburlasos | 711/167 |
| 2008/0059667 A1* | 3/2008 | Berenbaum et al. | 710/110 |
| 2008/0101147 A1* | 5/2008 | Amidi | 365/229 |
| 2009/0009212 A1* | 1/2009 | Brox | 326/30 |
| 2012/0089754 A1* | 4/2012 | Su et al. | 710/56 |

* cited by examiner

Integer ratio 2/1 master/slave clocks

DATA TRANSFER BETWEEN A MASTER AND SLAVE

BACKGROUND OF THE INVENTION

This application claims priority to GB Application No. 0624875.1 filed Dec. 13, 2006, the entire contents of which are incorporated herein by reference.

1. Field of the Invention

This invention relates to the field of data processing systems. More particularly, this invention relates to data transfers between initiators and recipients or masters and slaves.

2. Description of the Prior Art

Initiator and recipient devices, such as masters and slaves often operate at different frequencies, the master generally operating at a higher frequency than the slave. This can lead to problems when communicating data between the two devices. This problem is addressed by utilising a clock enable signal which basically acts to enable the input and output of the devices to ensure that data is only transmitted at a frequency governed by the clock enable signal. Thus, the frequency of this signal can be set to account for the lower frequency of the communicating devices and thereby ensure that the data communication is performed at a frequency that allows the lower frequency device to receive data at a rate it can cope with. In the AXI bus produced by ARM® only integer ratios of clock frequencies are allowed between the master and slave.

This severely limits possible frequencies that the slave can operate at. It can operate at the same frequency as the master or at this frequency divided by a factor of 2. This limitation in possible frequencies can be a limiting factor to some performance requirements.

It would be advantageous if more flexibility in clock ratios between the master and slaves could be allowed.

SUMMARY OF THE INVENTION

A first aspect of the present invention provides a data processing apparatus comprising at least one initiator operable to communicate with at least one recipient via a bus; said at least one initiator comprising an output port for sending data to said bus and an input port for receiving data from said bus; said data processing apparatus further comprising: an initiator clock signal generator, an initiator output enable signal generator and a initiator input enable signal generator, said initiator being clocked by said initiator clock signal; said output port being clocked by said initiator output enable signal such that said output port is operable to assert data to a write channel on said bus in response to said initiator output enable signal having a first predetermined level and said input port is operable to latch data received on a read channel on said bus in response to said initiator input enable signal having a second predetermined level; wherein said initiator output enable signal generator and initiator input enable signal generator are configured to output signals that are different to each other.

The provision of two enable signals allows intermediate clock ratios and therefore increases the flexibility of the system. A disadvantage is that there are now two additional signals required, however, the two enable signals are simple to generate and in the case of integer clock ratios the input clock enable signal can be made equal to the output clock enable signal and thus, there is backwards compatibility with previous systems having a single clock enable signal and integer frequency ratios.

In some embodiments said at least one recipient is clocked by a clock signal that is slower than said initiator clock signal by a half integer ratio.

The provision of two clock enable signals can easily and effectively support half integer clock signal ratios.

In some embodiments, said initiator output enable signal generator is arranged to generate a signal that has said first predetermined level during a triggering transition of a clock in said recipient and retains said first predetermined level for a clock cycle of said initiator clock.

If data is asserted on the write channel when the clock in the recipient transitions, then this data is valid for the recipient then. Furthermore, by retaining the value for an initiator clock cycle, the next time it becomes valid the initiator will be on a subsequent cycle with the next item of data. Thus, following these rules with the enable signals allows different initiator and recipient frequencies to communicate data.

In some embodiments, said initiator output enable signal is arranged to retain said first predetermined level for two initiator clock cycles where a second triggering transition of said recipient clock cycle occurs during said second initiator clock cycle and to only retain said first predetermined level for a single initiator clock cycle where a second triggering transition of said recipient clock does not occur during said second initiator clock cycle.

If data is to be written to the bus at a suitable rate for the recipient to be able to retrieve and process it, then the initiator output enable signal should take account of the recipient's clock. If the initiator output enable signal stays at the predetermined level allowing writes to the bus for two initiator cycles, then the recipient must transition twice in this time to be able to retrieve the two data items that are to be sent to the bus. Thus the initiator output enable signal is set to stay at the predetermined level for two initiator signals only if the recipient will transition a second time during this time. If not then the initiator output enable signal does not retain the value but transitions again to ensure that the data is asserted at the correct moment for the recipient to be able to receive it.

Although the first predetermined level could be either of the clock levels in some embodiments, said first predetermined level is a high level of said initiator output enable signal, said triggering transition is a rising edge of said recipient clock signal and said initiator clock cycle is from a rising edge to a rising edge.

In some embodiments said initiator input enable signal is arranged to provide a signal that transitions to a second predetermined level during each recipient clock cycle and retains said second predetermined level during a triggering transition of said initiator clock signal.

In order for each data item sent from the recipient to be received then the initiator input enable signal needs to have an enabling value for each clock cycle and needs to retain that value during a triggering transition of the initiator clock signal as this enables the value of that clock cycle to be latched into the initiator. By following such simple rules for the clock enable signals different recipient and initiator clock signals are made possible increasing the flexibility and performance of the system.

In some embodiments, said read enable clock is configured to attain said second predetermined level as close to a rising edge of said recipient as possible.

For some clock ratios, the initiator input enable signal can be asserted at different positions inside a recipient clock cycle, the only requirement being that the initiator input enable signal is valid for only one initiator clock cycle during the recipient clock cycle. In such cases, to make sure data from the recipient are stable, it is better to select to have the master input enable clock valid at the end of the recipient clock cycle where the timing allows such a choice. It should be noted that for a clock ratio of 3/2, there is no choice for the position of the initiator input enable signal, while for clock ratios such as 5/2 and 7/2 such a choice is possible.

In some embodiments, said first predetermined level and said second predetermined level are both the high level of the clock signal.

Depending on the design the recipient and initiator can be configured to react to either the high level or low level of the clock signal. The clock signal generators simply need to know which level they are triggered by and then they can be designed to produce the appropriate signal.

In some embodiments, said recipient is clocked by a clock signal that is an integer number of times said initiator clock and said input clock enable signal generator and said output clock enable signal generator are operable to output substantially identical clock enable signals.

The ability for the recipient and initiator to be able to operate with an integer ratio of clock signals, enables the device to be compatible with some conventional systems which have a single master/slave output enable signal and integer ratios of clock signals.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
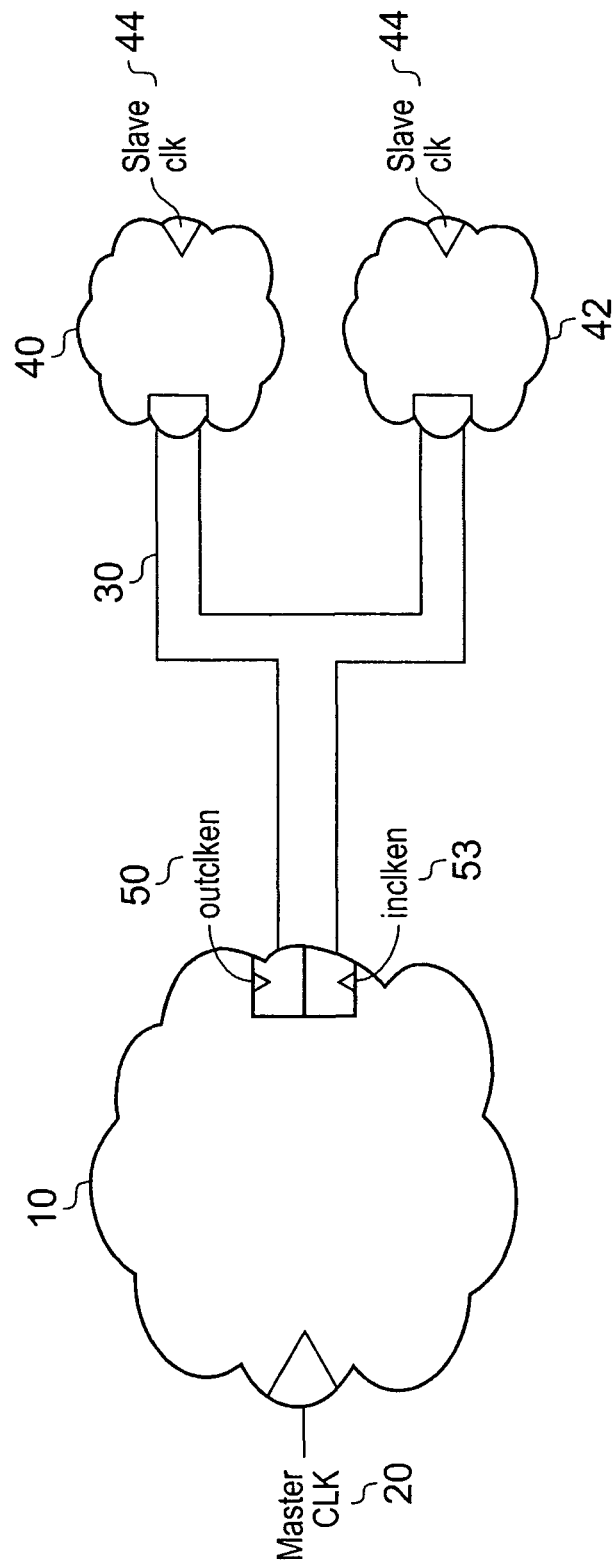
FIG. 1 schematically shows a system comprising a master and two slaves connected via a bus and clocked according to an embodiment of the present invention.

In FIG. 1 a master 10 communicates with slaves 40 and 42 via bus 30. Slaves 40 and 42 have considerably less processing power than master 10 and as such are clocked at a slower rate. In this embodiment slave clocks 44 are clocked a half integer number of times slower than master clock 20. In order to enable them to communicate successfully via bus 30, master 10 has two enable signals for communication with the bus, an "outclken" 50 and an "inclken" 53. The outclken 50 in effect clocks the write channel of bus 30, in that data from the master is asserted onto the bus in response to outclken 50 having a predetermined level. This data can then be sent via the write channel to the slave. In effect it qualifies signals output from the master. In practice write signals output from the master receive a response signal from the recipient according to a write protocol, the write signals asserting data to the bus are qualified by outclken, while the response signals are not qualified by outclken as they are signals output by the recipient. The inclken 53 in effect qualifies signals input to the master, thus it can be seen as clocking the read channel from the slave to the master, in that when it has a predetermined level, data sent from the slave via the read channel can be latched into the master. The use of these two signals with the appropriate selection of their values can allow half integer clock ratios between the master and slave. The aim is generally to allow the slave that has the lower clock cycle to operate at its maximum frequency. Providing outclken and inclken with appropriate values allows the slave to receive data in each clock cycle and output data in each clock cycle, with a master clock having a half integer clock ratio.

Figure 3A:
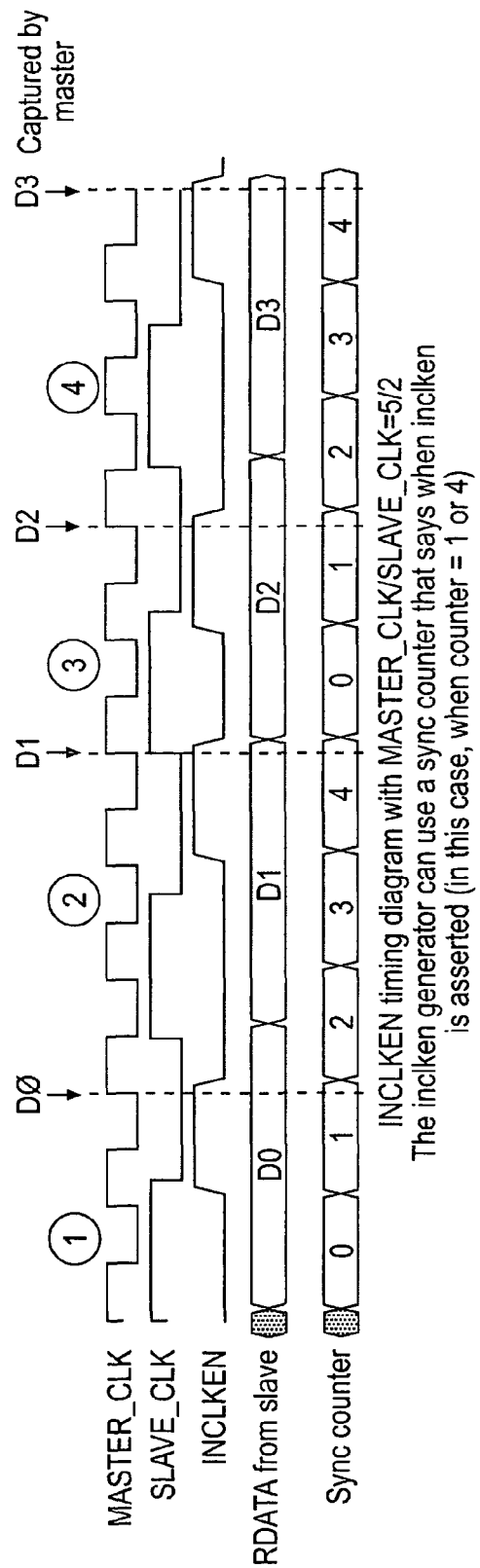
FIGS. 3a and 3b show timing diagrams for a master/slave clock ratio of 5/2.
Figure 3B:
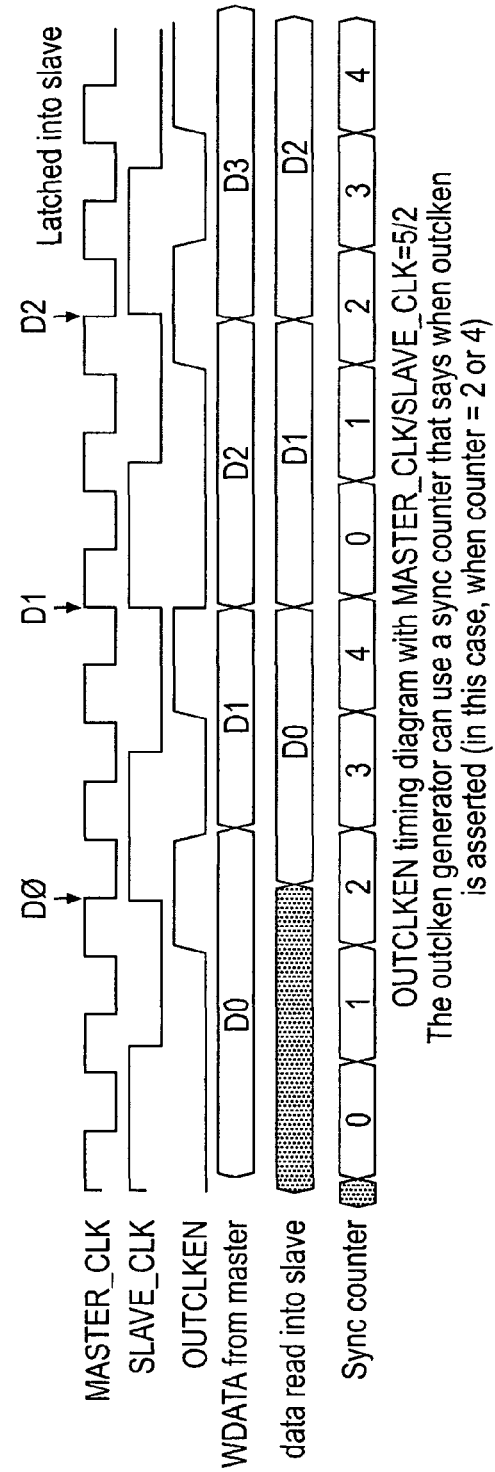
Figure 4:
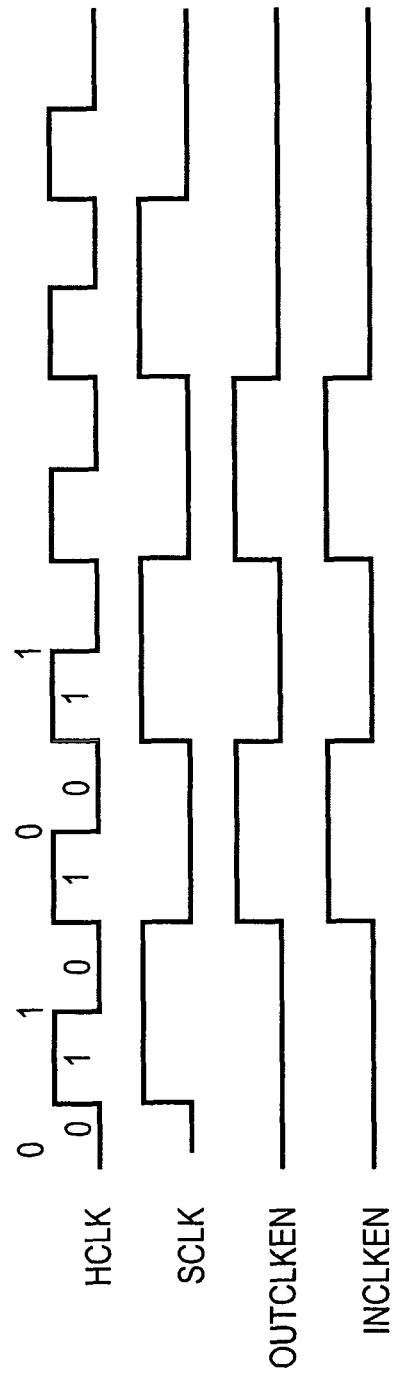
FIG. 4 shows a timing diagram for an integer master/slave clock ratio of 2/1.

The following FIGS. 2-4 show some examples of master and slave clocking frequencies and the input and output enable signals that are required to provide the correct data communication. The system will work provided inclken and outclken are valid for only one master clock cycle and in the case that the master logic works on a rising clock edge they are asserted on the rising edge of the master clock.

Figure 2A:
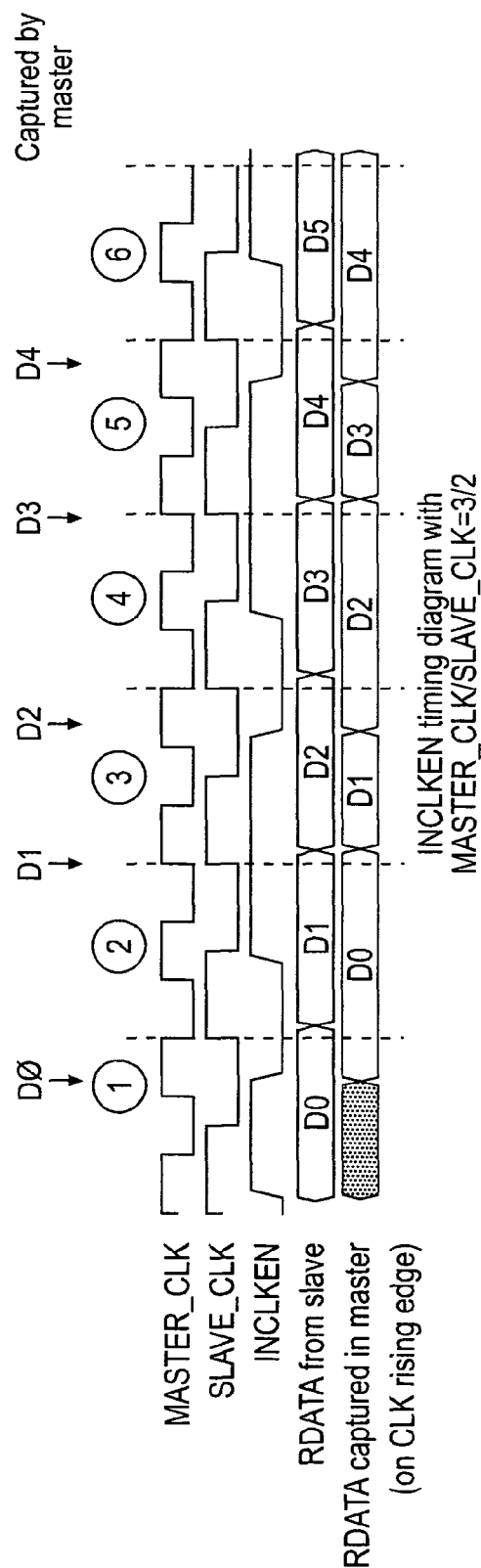
FIGS. 2a and 2b show timing diagrams for a master/slave clock ratio of 3/2.

FIG. 2a shows a timing diagram of the master clock, slave clock and the "inclken" signal or master input enable signal for a master/slave clock ratio of 3/2. The figure also shows when the data read from the slave is valid for a certain value and when it is captured in the master. Thus, at the start D0 is output from the slave to the read channel and is valid. The master is rising edge triggered and when the input clock enable signal "inclken" is high and the master clock goes high (towards the end of the first slave clock cycle), the data output from the slave during this clock cycle, i.e. D0 is captured by the master.

In the second slave clock cycle 2, D1 is output by the slave. In this clock cycle when the master clock goes high at the beginning of this cycle, inclken is low and thus no data is captured in the master. At the end of the slave clock cycle the master clock goes high again and at this point the inclken signal is high and thus D1 is captured by the master.

It should be noted that the capturing of data and the data being valid is shown as occurring slightly after the clock edges that trigger them as there is some delay in the system. These figures are schematic and a skilled person would appreciate that all systems have some delay and that this is not always shown in the figures for the sake of clarity. During the third slave clock cycle, D2 is captured in response to the master clock going high and inclken being high. Thus, as can be seen the data is latched into the master for each slave clock cycle although there is some delay.

Figure 2B:
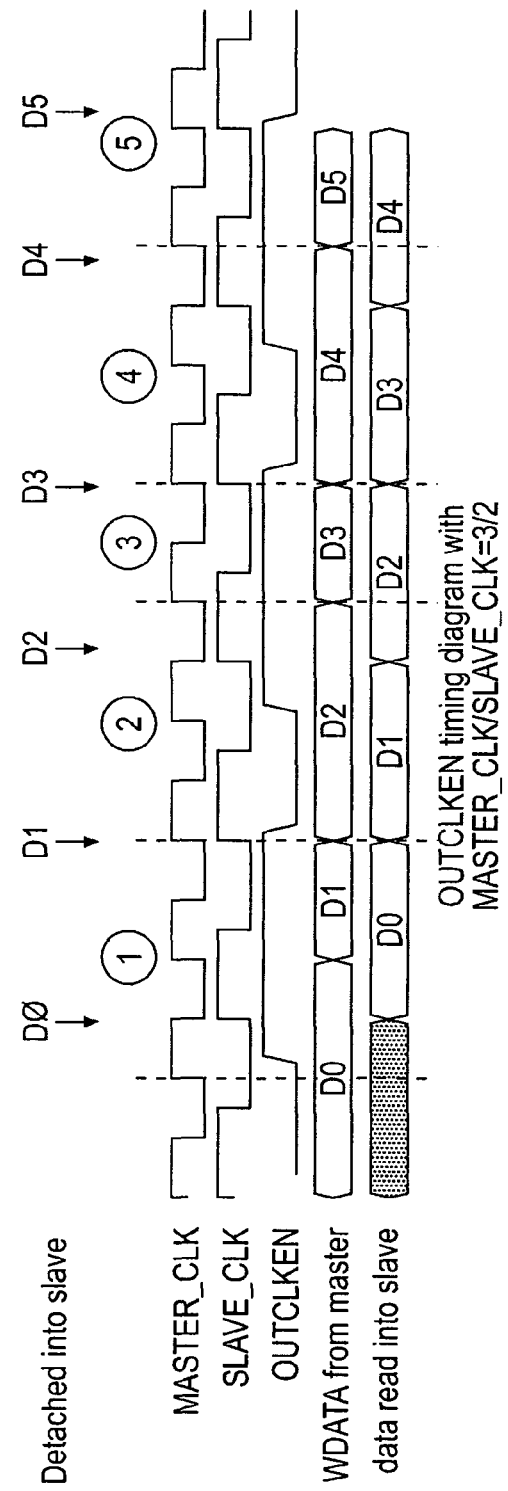

FIG. 2b shows how the master can output data to the bus. "Wdata from master" indicates when the master asserts data to the bus. During cycle 1 there are two master clock cycles and at the start D0 has been asserted at the output of the master on the write channel of the bus. When the slave clock goes high this is clocked into the slave. During cycle 1 master clock goes high and outclken is high and thus D1 is asserted onto the bus. On the next rising edge of the slave clock this is received at the slave. During cycle 2 which also lasts for two cycles of the master clock, at the start of this cycle the master clock goes high when outclken is high and thus the next piece of data from the master clock is asserted onto the bus. This can be read from the bus by the slave when the slave clock goes high. This is shown by the bottom line of this diagram. In cycle 3, the master clock goes high outclken is high at the start of this cycle and thus D3 is asserted on the bus. When the slave clock next goes high it is read into the slave. In the next cycle, cycle 4, the rising edge at the start of this cycle is high as is outclken and thus D4 is clocked into the bus. Outclken then goes low for a while which means that at the next rising edge of the master clock no data is asserted onto the bus. This in effect enables the slave to catch up with the master. When the slave clock goes high then D4 is read from the bus to the master. It is now possible for the master to assert data onto the bus again and this occurs at the end of cycle 4, beginning of cycle 5, for the next rising edge of the master clock.

Thus, it can be seen from FIGS. 2a and 2b that by the use of suitable inclken and outclken signals data can be communicated between slaves and masters that operate at half integer clock ratios.

A further example of this is shown in FIGS. 3a and 3b. This figure also shows an example of how the inclken and outclken signals can be generated. There are a number of ways in which they can be generated and this is only one example. In this example the two signals are generated by a synchronous counter. FIG. 3a shows master clock, slave clock, and inclken and the data being output from the slave. This diagram shows how the inclken signal is generated using a synchronous counter. There are many different ways of generating the inclken and outclken signals depending on the waveform required. This is simply one example. The inclken is high when the counter is one or four. In this diagram, the data will be captured in the master on the rising edge of the master clock when inclken is high as is shown by the arrows at the top of the figure. Thus at the end of cycle 1 the master will capture D0 and at the end of Cycle 2 it will capture D1, at the end of cycle 3 it will capture D2, and the end of cycle 3 it will capture D3. In this embodiment in the cycles where there is a choice inclken is selected to be valid towards the end of the recipient clock cycle. This helps ensure that the data from the slave is valid when the data is received at the master.

FIG. 3b shows the data being output from the master to the bus for a master clock slave ratio of 5/2. Once again the synchronous counter is used to generate the enable signal. In this case the outclken signal is generated when the counter equals 2 or 4. In this case at the beginning D0 is output from the master and is read into the slave when the slave goes high.

FIG. 4 shows a timing diagram of a further embodiment. In this embodiment there is an integer ratio between the master clock and the slave clock. Thus, in this case the outclken and inclken are the same signal and in fact have the same clock cycle as the slave clock although they are out of sync with it. This clearly shows how such a system can be backwards compatible with a known system having only a single enable signal.

Although illustrative embodiments of the invention have been described in detail herein with reference to the accompanying drawings, it is to be understood that the invention is not limited to those precise embodiments, and that various changes and modifications can be effected therein by one skilled with the art without departing from the scope and spirit of the invention as defined by the appended claims.

We claim:

1. A data processing apparatus comprising at least one initiator configured to communicate with at least one recipient via a bus; said at least one initiator comprising an output port for sending data to said bus and an input port for receiving data from said bus; said data processing apparatus further comprising:
    an initiator clock signal generator for generating an initiator clock signal,
    an initiator output enable signal generator for generating an initiator output-enable signal, and
    an initiator input enable signal generator for generating an initiator input enable signal, said initiator being clocked by said initiator clock signal;
    said output port being clocked by said initiator output enable signal such that said output port is configured to assert data to a write channel on said bus in response to said initiator output enable signal having a first predetermined level and said input port is configured to latch data received on a read channel on said bus in response to said initiator input enable signal having a second predetermined level; wherein
    said initiator output enable signal generator and initiator input enable signal generator are configured to output signals that are different from each other, said at least one recipient is clocked by a recipient clock signal that is slower than said initiator clock signal by a half integer ratio; said initiator output enable signal generator is configured to generate said initiator output enable signal that has said first predetermined level during a triggering transition of said recipient clock signal and retains said first predetermined level for a clock cycle of said initiator clock; and said initiator output enable signal is configured to retain said first predetermined level for two initiator clock cycles where a second triggering transition of said recipient clock signal occurs during the second of the two initiator clock cycles and to only retain said first predetermined level for a single initiator clock cycle where a second triggering transition of said recipient clock signal does not occur during said second of the two initiator clock cycles.

2. A data processing apparatus according to claim 1, wherein said first predetermined level is a high level of said initiator output enable signal, said triggering transition is a rising edge of said recipient clock signal and said initiator clock cycle is from a rising edge to a rising edge.

3. A data processing apparatus according to claim 1, wherein said initiator input enable signal is arranged to provide a signal that transitions to said second predetermined level during each recipient clock cycle and retains said second predetermined level during a triggering transition of said initiator clock signal.

4. A data processing apparatus according to claim 1, wherein said initiator input enable signal is configured to attain said second predetermined level as close to a rising edge of said recipient clock signal as possible.

5. A data processing apparatus according to claim 1, wherein said first predetermined level is the high level of the initiator output enable signal, and the second predetermined level is the high level of the initiator input enable signal.

6. A method of processing data involving communicating data between at least one initiator clocked by an initiator clock and at least one recipient clocked by a recipient clock, said at least one initiator and at least one recipient being connected by a bus, said method comprising the steps of:
    outputting data from said at least one initiator to said bus in response to an initiator output enable signal having a first predetermined level; and
    receiving data from said bus in response to an initiator input enable signal having a second predetermined level; wherein said recipient clock is slower than said initiator clock by a half integer ratio and said initiator output enable signal and initiator input enable signal are different from each other, said initiator output enable signal has said first predetermined level during a triggering transition of said recipient clock signal and retains said first predetermined level for a clock cycle of said initiator clock and
    said initiator output enable signal is configured to retain said first predetermined level for two initiator clock cycles where a second triggering transition of said recipient clock signal occurs during the second of the two initiator clock cycles and to only retain said first predetermined level for a single initiator clock cycle where a second triggering transition of said recipient clock signal does not occur during said second of the two initiator clock cycles.

7. A data processing apparatus comprising at least one initiator configured to communicate with at least one recipient via a bus, said at least one initiator comprising an output port for sending data to said bus and an input port for receiving data from said bus, said data processing apparatus further comprising:

an initiator clock signal generator means for generating an initiator clock signal, an initiator output enable signal generator means for generating an initiator output enable signal, and an initiator input enable signal generator means for generating an initiator input enable signal, said initiator being clocked by said initiator clock signal, wherein said output port being clocked by said initiator output enable signal such that said output port is configured to assert data to a write channel on said bus in response to said initiator output enable signal having a first predetermined level and said input port is configured to latch data received on a read channel on said bus in response to said initiator input enable signal having a second predetermined level, wherein said initiator output enable signal generator means and initiator input enable signal generator means are configured to output signals that are different from each other, said at least one recipient is clocked by a recipient clock signal that is slower than said initiator clock signal by a half integer ratio, said initiator output enable signal generator means is configured to generate said initiator output enable signal that has said first predetermined level during a triggering transition of said recipient clock signal and retains said first predetermined level for a clock cycle of said initiator clock; and said initiator output enable signal is configured to retain said first predetermined level for two initiator clock cycles where a second triggering transition of said recipient clock signal occurs during the second of the two initiator clock cycles and to only retain said first predetermined level for a single initiator clock cycle where a second triggering transition of said recipient clock signal does not occur during said second of the two initiator clock cycles.

8. A data processing apparatus according to claim 7, wherein said first predetermined level is a high level of said initiator output enable signal, said triggering transition is a rising edge of said recipient clock signal and said initiator clock cycle is from a rising edge to a rising edge.

9. A data processing apparatus according to claim 7, wherein said initiator input enable signal is arranged to provide a signal that transitions to said second predetermined level during each recipient clock cycle and retains said second predetermined level during a triggering transition of said initiator clock signal.

10. A data processing apparatus according to claim 7, wherein said initiator input enable signal is configured to attain said second predetermined level at a rising edge of said recipient clock signal.

11. A data processing apparatus according to claim 7, wherein said first predetermined level is the high level of the initiator output enable signal, and the second predetermined level is the high level of the initiator input enable signal.

* * * * *